Feb. 25, 1941. L. H. GARLINGHOUSE 2,233,005
PORTABLE SELF-SUPPORTING MATERIAL HANDLING HOPPER
Filed April 30, 1940 2 Sheets-Sheet 1
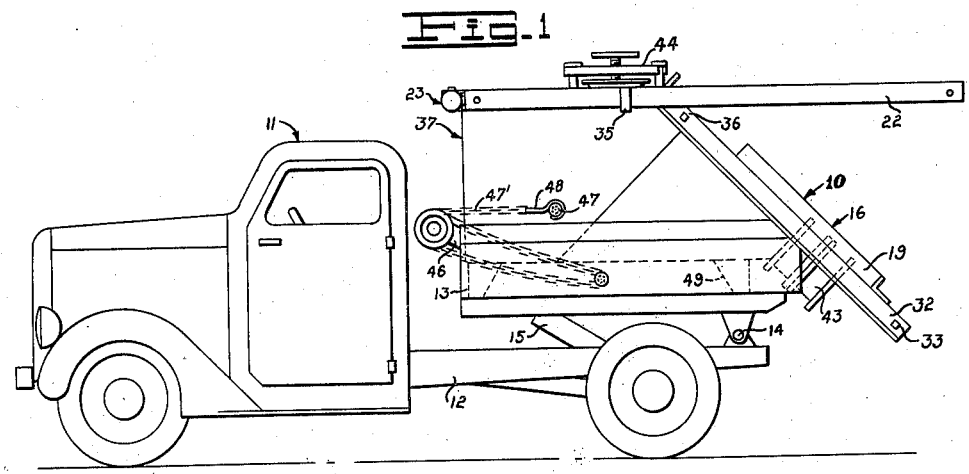
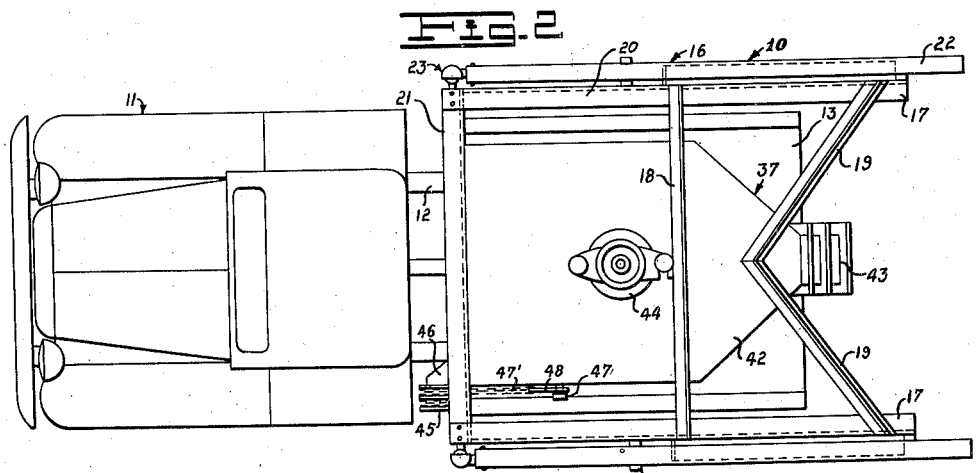
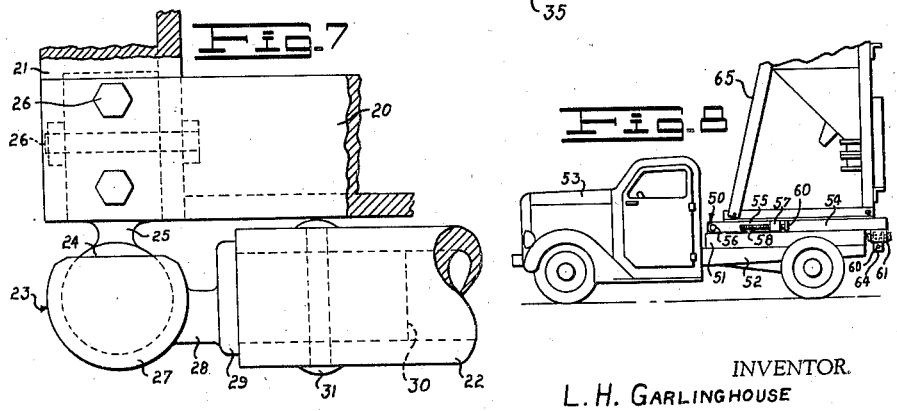
INVENTOR.
L. H. GARLINGHOUSE
BY
ATTORNEY.

Feb. 25, 1941.     L. H. GARLINGHOUSE     2,233,005
PORTABLE SELF-SUPPORTING MATERIAL HANDLING HOPPER
Filed April 30, 1940     2 Sheets-Sheet 2
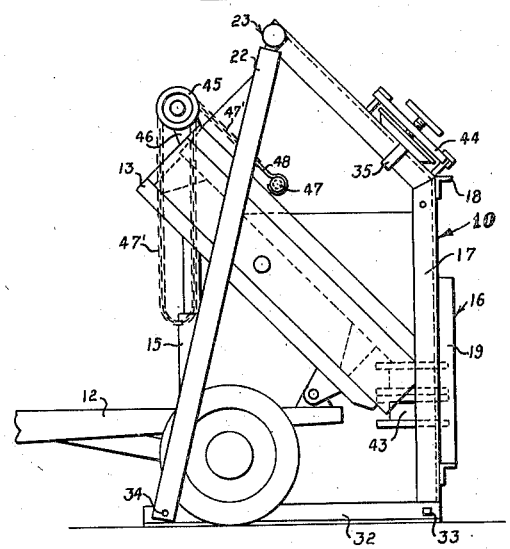
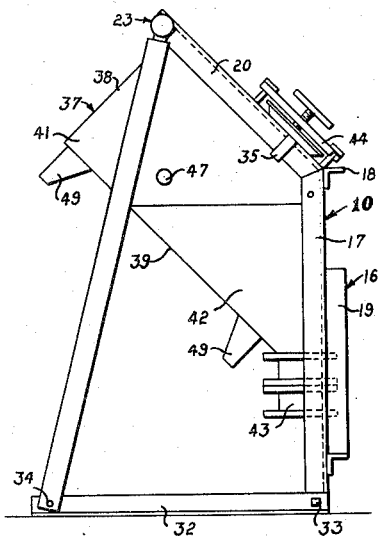
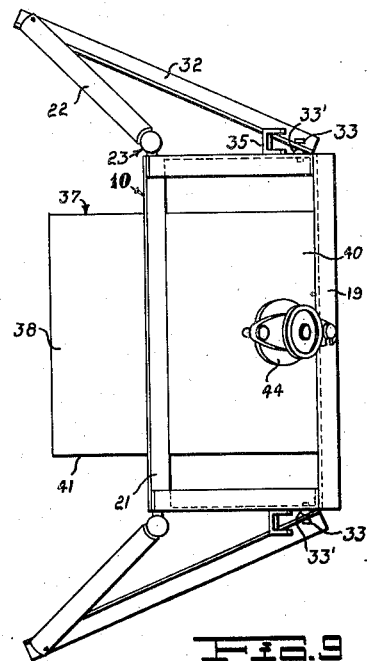
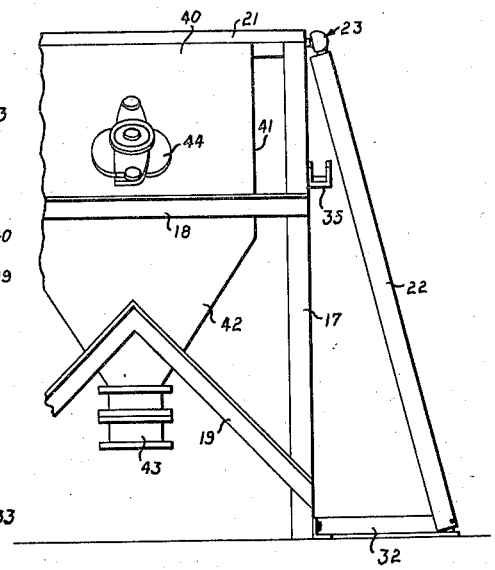
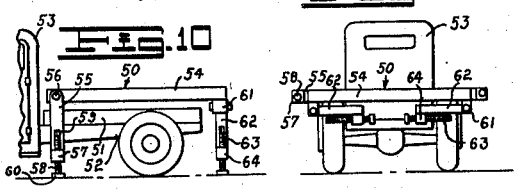
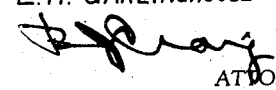
INVENTOR.
L. H. GARLINGHOUSE
BY
ATTORNEY.

Patented Feb. 25, 1941

2,233,005

UNITED STATES PATENT OFFICE 2,233,005

PORTABLE SELF-SUPPORTING MATERIAL HANDLING HOPPER

Leslie H. Garlinghouse, Los Angeles, Calif.

Application April 30, 1940, Serial No. 332,521

5 Claims. (Cl. 214—130)

The general object of my invention is to provide a novel portable cement hopper which eliminates the disadvantages of sacked cement.

Another object of the invention is to provide a novel portable cement hopper which may be transported by a standard dump truck the hopper being left at the job while the truck is free for other uses.

Another object of the invention is to provide a novel collapsible supporting framework for a portable hopper.

Another object of the invention is to provide a novel portable cement hopper in which the discharge gate is at a suitable elevation for unloading into wheelbarrows or the like.

Another object of the invention is to provide a novel cement hopper which may be used in conjunction with a weighing device to determine the amount discharged.

Another object of the invention is to provide a novel portable hopper which may be adapted for use with aggregates, liquids, or other materials.

Another object of the invention is to provide a novel portable hopper which may be charged from an overhead silo.

Another object of the invention is to provide novel means for supporting a transportable hopper.

Other objects and the advantages of my invention will be apparent from the following description taken in connection with the accompanying drawings, wherein:

Fig. 1 is a side elevation of a hopper, embodying the features of my invention, shown as mounted in transporting position upon a standard dump truck;

Fig. 2 is a top plan view showing the hopper mounted in transporting position upon the truck;

Fig. 3 is a side elevation of the hopper during the erecting operation;

Fig. 4 is a side elevation showing the hopper in discharging position;

Fig. 5 is a top plan view showing the hopper in discharging position;

Fig. 6 is a fragmentary front view showing the hopper in discharging position;

Fig. 7 is an enlarged fragmentary top plan view of the ball and socket joint at the upper end of one of the inclined support members;

Fig. 8 is a side elevation of a modified transporting unit shown as mounted on a truck with the hopper thereon;

Fig. 9 is a rear view of the modified transporting unit and truck; and

Fig. 10 is a side elevation of the transporting unit shown as raised from the truck.

The use, by a contractor, of sacked cement has various disadvantages which may be overcome by the use of bulk cement and a portable cement hopper. The present invention provides means by which the cost of sacking the cement and hand loading and unloading a vehicle are eliminated while the building of a cement shed at the job location is made unnecessary.

Referring to the drawings by reference characters I have indicated my portable cement hopper generally at 10. As shown in Figs. 1, 2 and 3 the hopper 10 is mounted on a standard dump truck 11 having a chassis 12 and a dump body 13 which is pivoted as at 14 and which may be elevated by suitable means as at 15.

The hopper 10 includes a metal supporting frame which is indicated generally at 16. The various portions of the frame are preferably made of structural steel members welded or otherwise suitably connected together.

As shown the frame 16 includes a pair of leg members 17 rigidly connected by an upper cross member 18 and a lower cross member 19. The leg members 17 have upper portions 20 inclined relative thereto. The ends of the inclined portions 20 are rigidly connected by a cross member 21. The frame 16 includes a pair of swiveling leg members 22, preferably tubular, each connected to the frame by a ball-and-socket joint 23.

The ball-and-socket joint 23, as shown in Fig. 7, includes an inner ball member 24 which has a shank portion 25 which is fastened to the inclined portions 20 and the cross member 21 by suitable bolts 26. Surrounding the member 24 I provide a socket 27 which may be cupped over the ball member 24 as by swaging. The socket member 27 has a shank 28 which includes a flange 29 adjacent the end of the leg member 22 and a cylindrical portion 30 which fits within the hollow portion of the tubular leg member 22. The shank 28 is secured to the leg member 22 as by a rivet 31. It will be understood that any other equivalent universal joint may be substituted for the ball-and-socket joint 23.

The frame 16 also includes a pair of base members 32 connected to the leg members 17 by bolts 33 and to the leg members 22 by bolts 34 when the device 10 is in the discharging position. The bolts 33 as shown have hemispherical washers 33' (see Fig. 5) placed between the legs 17 and the base members 32 so that the latter may be swung outwardly as in Figs. 5 and 6.

When the device 10 is in the transporting position the leg members 22 are held horizontal by suitable brackets 35 on the portions 20, and the base members 32 are held adjacent the leg members 17 by bolts 36.

Within the frame 16 I provide a hopper or receptacle member indicated generally at 37. As shown the receptacle 37 includes an end wall 38, a bottom wall 39, a top wall 40, side walls 41 and a reduced pyramidal portion 42 opposite the end wall 39 terminating in a standard discharge gate 43.

In a suitable position on the top wall 40 I provide a moisture proof charging gate 44 as clearly indicated in Figs. 1 and 2.

A standard differential pulley block 45 is attached by a bracket 46 to the forward end of the dump body 13. A pin 47 engages the end of the chain 47' of the pulley block 45 through a suitable hook 48.

I provide brackets 49 on the bottom wall 39 of the hopper 37 which when the device 10 is in transit support the hopper within the dump body 13.

In use the device 10 is mounted on the truck 11 as shown in Figs. 1 and 2 and the hopper 37 is charged through the charging gate 44 preferably from an overhead cement silo. The truck 11 is then driven to the location where the cement is to be used. The dump body 13 is then elevated in the usual manner the device 10 being held within the dump body 13 by means of the differential pulley block 45, the pin 47 and the hook 48.

When the truck arrives at its destination the base members 32 are disengaged from the bolts 36, swung pivotally about bolts 33, and placed as is shown in Figs 3, 4, 5 and 6. The leg members 22 are disengaged from the supporting brackets 35 and swung about the ball-and-socket joint 23 to the position shown in Figs. 3, 4, 5 and 6 where they are fastened to the base members 32 by the bolts 34. The device 10 is then disengaged from the dump body 13 by use of the differential pulley block 45, the hook 48 being disengaged from the point 7. The truck 11 may then be driven away leaving the device 10 as a self-supporting unit. It will readily be seen that loading the device 10 upon the truck 11 is merely the reverse of the operation described above.

Wheelbarrows or the like may be conveniently loaded through the discharge gate 43. A weighing device may be employed below the discharge gate 43 so that the amount of each charge may be accurately determined.

In Figs. 8, 9 and 10 I show a modified transporting unit indicated generally at 50. As shown the transporting unit is mounted on a support 51 which is secured to the chassis 52 of a standard truck 53.

The transporting unit includes a platform 54 with supports 55 pivotally mounted as at 56 on both sides and near the front thereof. The supports 55 are provided with enlarged end portions as at 57 which threadedly receive lift screws 58 having a wrench engaging portion 59 and a base 60.

The rear corners of the platform 54 are provided with channel members 61 on which supports 62 are pivotally mounted. The supports 62 include lift screws 63 threadedly engaging enlarged end portions 64 similar to those previously described.

In use a portable cement hopper 65 similar in all respects to the one previously described may be mounted on the transporting unit 50 as shown in Fig. 8. When the truck arrives at its destination the supports 55 and 62 are pivoted downward and then the lift screws 58 and 63 are screwed down raising the platform 54 from the truck as shown in Fig. 10.

From the foregoing description it will be apparent that I have provided a novel portable hopper device which is simple in construction and highly efficient in use.

Having thus described my invention I claim:

1. In a portable hopper apparatus, a receptacle having a pair of leg members thereon, a second pair of supporting legs mounted on said receptacle, base members connecting the lower portions of said leg members, said receptacle including a top, bottom, sides and a lower portion, said top having a charging aperture and a closure therefor, said lower portion having a discharging aperture and a closure therefor, and means on said receptacle to engage a dump truck.

2. In a portable hopper apparatus, a receptacle including a wall portion adapted to engage a truck body, said hopper having a charging aperture disposed above said one wall and permitting a charging operation while on a truck, a leg member on said receptacle and adapted to engage a supporting surface while the apparatus is on a truck, other leg members releasably mounted on the receptacle and movable to a position to engage a supporting surface while the apparatus is on a truck, and means permitting a discharging operation from the receptacle while on a supporting surface.

3. In a portable hopper apparatus, a receptacle including one wall portion adapted to engage a truck body, said receptacle having a charging aperture disposed above said one wall, means on the receptacle to hold the latter on a truck, leg members rigid on said receptacle, other leg members swingingly mounted upon the receptacle and means to hold said last mentioned leg members in receptacle supporting position.

4. In a portable hopper apparatus, a receptacle having a charging aperture in one portion, said receptacle having a discharge aperture in another portion, said receptacle having a wall portion disposed opposite said discharging aperture, said one wall portion being adapted to be disposed upon a dumping truck body, said receptacle having legs thereon to support one end of the receptacle with the discharge aperture at the lowest portion of the receptacle, said receptacle having other legs thereon, said other legs being universally mounted and movable outwardly from the receptacle to support and brace the receptacle.

5. In a portable hopper apparatus, a receptacle, a framework including a pair of vertical leg members connected by cross members, said leg members having inclined portions at the upper ends, said leg members and said inclined portions being secured to said receptacle, a pair of supporting legs swivelly connected adjacent the upper end of said inclined portions, base members connecting the lower portions of said vertical leg members and said supporting legs, said receptacle including a top, bottom, sides and a lower reduced portion, said top having a charging aperture and having a closure therefor, said reduced portion having a discharging aperture and having a closure therefor, and means on said receptacle to support the receptacle on a dump truck.

LESLIE H. GARLINGHOUSE.